April 1, 1958  E. A. HAMACHER  2,829,262
X-RAY APPARATUS
Filed Jan. 26, 1953  2 Sheets-Sheet 2

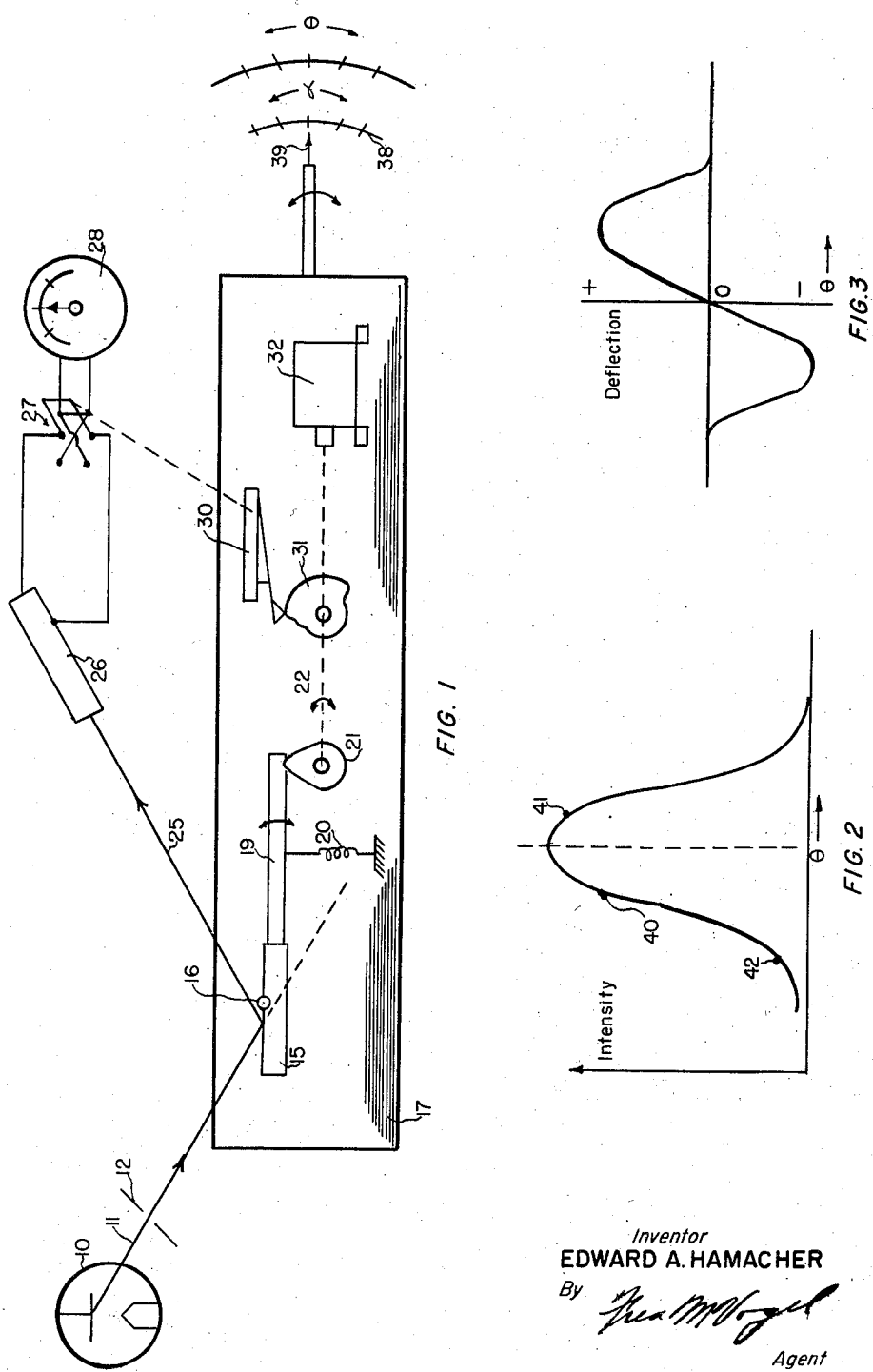

Inventor
EDWARD A. HAMACHER
By
Agent

United States Patent Office 2,829,262
Patented Apr. 1, 1958

2,829,262
X-RAY APPARATUS

Edward A. Hamacher, Irvington-on-Hudson, N. Y., assignor, by mesne assignments, to North American Philips Company, Inc., New York, N. Y., a corporation of Delaware Application January 26, 1953, Serial No. 333,306

13 Claims. (Cl. 250—53)

My invention relates to X-ray apparatus for the orientation of flat specimen single crystals and to methods for determining the orientation of the crystal.

In the conventional technique for determining the orientation of flat specimen crystals, a collimated beam of X-radiation is directed at the crystal while the crystal is slowly rotated. The diffracted beam of X-radiation from the crystal, the intensity of which is a function of the angular position of the crystal, enters a detector, e. g. a Geiger-Müller tube. The angle at which maximum intensity of radiation is obtained determines the orientation of the crystal. This technique has the obvious disadvantage that it is laborious and subject to human error.

A principal object of my invention is to provide apparatus for accurately and expeditiously determining the orientation of flat-specimen single crystals.

A further object of my invention is to provide a method for orienting flat-specimen single crystals which is substantially free of operator judgment.

These and further objects of the invention will best be understood from the following description.

In accordance with my invention, I determine the orientation of a flat specimen single crystal by rapidly oscillating the crystal through a wide angular range while impinging a primary beam of X-radiation on one flat surface of the crystal and detecting the diffracted beam of radiation emerging from the crystal. By adjusting the mean angular position of the crystal relative to the primary beam of radiation and reversing the polarity of the indication of the diffracted beam of radiation until the indication of the average intensity of the diffracted beam of radiation is reduced to zero, it is possible to obtain a rapid indication of the orientation of the crystal. More particularly, if the mean angular position of the crystal is adjusted to coincide with the orientation of the crystal, the indication of the total intensity of the diffracted beam of radiation will be zero. Consequently, I provide means to adjust the mean angular position of the crystal relative to the primary beam of radiation, and adjust those means until the indication of the total intensity of the diffracted beam of radiation emerging from the crystal is reduced to zero and the orientation of the crystal is thereby determined.

In order to reduce the likelihood of error in the method according to my invention, I also employ a special collimator of unique design in the path of the primary beam of radiation. The collimator is a planar member constituted by a wide portion of high absorption and a narrow portion of low absorption. This collimator causes the diffracted beam of radiation to be spread over a wider angular range and to be concentrated at the correct angle for proper detection. The collimator may also comprise a discontinuous member disposed in the path of the primary beam. This latter feature of the invention can be used either alone or in combination with the complete diffraction apparatus described above.

The invention will now be described with reference to the accompanying drawing in which:

Fig. 1 is a schematic diagram of one form of crystal orienting apparatus in accordance with the invention;

Fig. 2 is a curve showing the variation of the reflected X-ray beam intensity with $\theta$, the angle between the primary X-ray beam and a given set of atomic planes of the specimen;

Fig. 3 is a curve showing the variation in meter deflection with the angle $\theta$ for a reflected beam having the variation shown in Fig. 2;

Figure 7A:
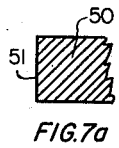
Figure 7B:
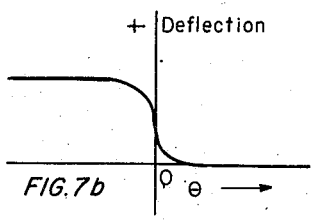
Figure 8A:
Figure 8B:
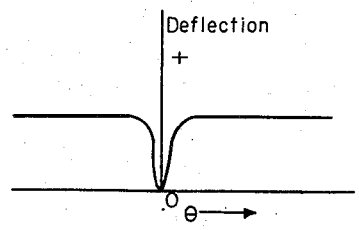

Figs. 7a, and 7b show, respectively, a divergence slit in accordance with the invention and the variation of the reflected X-ray beam intensity with the angle $\theta$ thereof;

Figs. 8a and 8b show, respectively, another form of divergence slit in accordance with the invention and the variations of the reflected X-ray beam intensity with the angle $\theta$ thereof.

Referring now to Fig. 1, an X-ray difffraction apparatus according to the invention comprises an X-ray tube 10, shown diagrammatically, for producing a primary beam 11 of X-radiation. By any suitable well-known means, for example, filters (not shown) or the correct target material of the tube, the primary beam is monochromatized and directed through a collimating system 12, shown here simply as a divergence slit of regular configuration, usually rectangular. The primary beam 11 is directed onto the face of a specimen crystal plate 15 whose orientation is to be determined. The angle between an extension of the primary X-ray beam 11 and a given set of atomic planes of the crystal plate 15 will be hereinafter referred to as the angle $\theta$, and it is desired to determine an angle $\alpha$ between the given set of planes and the face of the crystal.

The crystal plate 15 is mounted to be pivotable about a shaft 16, and is also secured in such a manner to a rectangular supporting plate or arm 17 so as to be rotatable about the shaft 16 when the arm 17 is rotated thereabout. Rigidly secured directly to the plate 15 is an arm 19 which is resiliently urged by a spring 20 into engagement with an oscillating cam 21. The system 15, 16, 17, 19, 20 and 21 is arranged so that rotation of the cam 21 in the direction of the arrow 22 will cause the crystal plate 15 to oscillate about the shaft 16 a given angular range around a given mean position or angle $\theta$. The angle $\theta$, on the other hand, is determined by the angular position of the supporting arm 17. Accordingly, variation of the angle $\theta$ is obtained by rotation of the arm 17 about the shaft 16, and the angular range of oscillation of the specimen 16 around the mean angular position $\theta$ is determined by the shape of the cam 21 and/or the point at which the cam 21 engages the arm 19.

The reflected X-ray beam 25 from the specimen face 15 is detected by a suitable form of detector 26, shown here as a Geiger tube, coupled in turn through a suitable network (not shown) and a double-throw, double-pole switch 27 to a current measuring instrument 28, for example, a meter. The meter 28 preferably reads zero at the center of the scale. The switch 27 serves to reverse the direction of current through the meter 28 and is actuated by, for example, a microswitch 30 operated in turn by a second cam 31. Actually, the switch 27 would be part of the microswitch 30 and is only shown here as a separate device for simplicity. Both cams 21, 31 are driven by the same source of power, for example, an electric motor 32 and may as a matter of fact be mounted on the same shaft. Additionally, the motor 32, microswitch 30, and the cams 21, 31 are all mounted on the supporting arm 17. The relative positions of the cams 21, 31 are arranged so that each time the oscillating speciman 15 passes through the mean of the oscillation, the microswitch 30 is actuated causing the switch 27 to reverse the direction of the current through the meter 28.

The operation of the device shown in Fig. 1 will now be described in connection with Figs. 2 and 3. Fig. 2 shows the variation in X-ray intensity with the angle $\theta$ as the specimen 15 is rotated relative to the direction of the primary beam. The process of orientation comprises determining the angle at the peak of the curve. Let us assume, for example, that the arm 17 is set at an angle $\theta$ corresponding to the point 40 on the curve and the angular range of oscillation of the specimen has been set between the angles corresponding to the points 41 and 42. As described above, the switch 27 reverses the current flow through the meter each time that the specimen passes through the angle corresponding to the point 40. Consequently, the amount of charge through the meter in the half cycle beginning at point 42 to point 40 is less than that of the other half cycle from point 40 to 41, and there is a net deflection of the meter in one direction. On the other hand, if the mean of the oscillation is set on the other side of the reflection (to the right of the peak in Fig. 2) the meter needle will be deflected in the other direction.

The resulting deflection of the meter with the angle $\theta$ varies as shown in Fig. 3. Obviously, then, when the mean is set at the angle corresponding to the peak of the curve shown in Fig. 2, the amount of charge flowing through the meter for one half of the oscillation period is just cancelled by the charge flowing during the other half cycle and there will be no net deflection of the meter; therefore, the correct angle $\alpha$ will have been determined. The operator merely adjusts the arm 17 while the specimen 15 is oscillating, once the reflection has been located, until the meter reads zero.

The angle $\alpha$ can be read directly from the position of the arm 17 by first calibrating the instrument by inserting a specimen sample having a known angle $\alpha$ of zero into the apparatus, adjusting the arm 17 until zero reading of the meter is obtained, and then adjusting the movable scale 38 so that the pointer 39 reads zero.

The response shown in Fig. 3 leaves some ambiguity because the meter also reads zero when the crystal plate 15 is set some distance on either side of the reflection. This may be obviated in accordance with a further feature of the invention by providing a suitably designed collimating system to obtain the modified response curve shown in Fig. 4. As will be noted from that figure, the lower part of the response curve has been materially broadened to extend over a much larger angular range than that of Fig. 2 so that there will be a net deflection of the meter, thereby indicating that the reflection has been located, though the specimen is still located at a considerable distance from the correct crystal position at the peak of the curve. In addition, the peak of the curve has been sharpened in order to increase the accuracy of the instrument.

Figure 4:
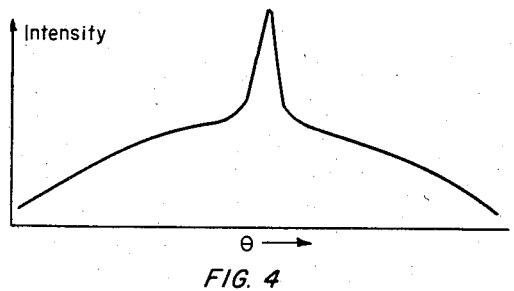
Fig. 4 is a curve showing the variation of the reflected X-ray beam intensity with the angle $\theta$ of a diffraction apparatus including a collimating system in accordance with the invention.
Figure 5:
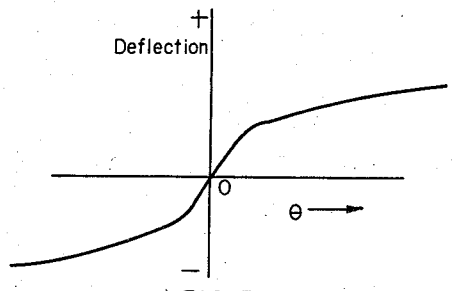
Fig. 5 is a curve showing the variation of meter deflection with the angle $\theta$ for a reflected beam having the variation shown in Fig. 4.

The meter deflection with the angle $\theta$ corresponding to the response shown in Fig. 4 is shown in Fig. 5. As will be noted, the meter will read zero only at one point over the angular range encompassed by Fig. 3, whereas there are three zero points in Fig. 3 for the same angular range. The span of the lower broad portion of the response curve shown in Fig. 4 is preferably chosen by adjustment of the collimating system to include a desired angular oscillation range of the specimen 15.

Figure 6A:
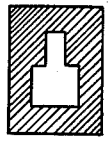
Fig. 6a, 6b and 6c are plan views of three variations of a divergence slit of the collimating system of the invention.
Figure 6B:
Figure 6C:
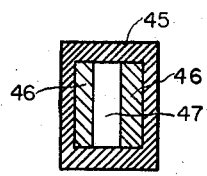

The simplest form of collimating system required to produce the broad-based, sharp-peaked response curve shown in Fig. 4, the broad base serving to assist the location of the reflection and the sharp peak serving to accurately locate the center of the peak, is that of a divergence slit disposed in the path of the primary beam and having an irregularly-shaped aperture constituted by a wide portion and a narrow portion. Three examples to illustrate this feature of the invention are shown in Figs. 6a, 6b and 6c. The divergence slits shown in Figs. 6a and 6b have an aperture constituted by a wide portion and a narrow portion along the length thereof. The divergence slit shown in Fig. 6c comprises an impervious frame 45 supporting a pair of thin absorbing filters 46 defining an opening 47 therebetween, the filter 46 permitting only a portion of the beam to pass through whereas the opening 47 allowing the entire beam to pass through. For the apparatus shown in Fig. 1, the divergence slits shown will be disposed such that their length is parallel to the axis of rotation 16 of the specimen 15. The configurations shown serve merely to illustrate this feature of the invention. Actually, the only requirement of the collimating system of the invention is that, in a plane perpendicular to the specimen and the specimen axis of rotation (the plane of Fig. 1 of the drawing), the shape of the primary beam is modified so that both a wide and a narrow beam impinges simultaneously on the crystal plate.

Figs. 7a and 7b show another form of collimating system for eliminating the ambiguity discussed above in connection with Figs. 1, 2 and 3. In this case, the divergence slit comprises a discontinuous member 50 having a sharp edge 51 which extends about half way into the path of the primary beam, which lies along a line connecting the focal spot of the anode of the X-ray tube 10 and the axis of rotation of the specimen. If, for example, the member 50 is disposed above the beam, then the entire lower half of the beam will be uncollimated and, consequently, the reflected beam intensity will be substantially constant below the angle $\theta$ corresponding to the correct position of the crystal. On the other hand, past this angle $\theta$, the member 50 will prevent any radiation at the correct Bragg angle from striking the specimen and, therefore, the intensity will be zero. Fig. 7b shows such a response curve, which may be utilized with the apparatus shown in Fig. 1. In addition this collimating system may be employed without the oscillating system described in connection with Fig. 1 since all that is necessary is that the operator rotate the specimen until the meter reads half of the maximum reading.

Figs. 8a and 8b show a further embodiment illustrating this feature of the invention in which the collimating system comprises a thin, radiation-impervious member disposed in the center of the path of the beam. With such an arrangement, a response curve as shown in Fig. 8b is obtained in which the reflected beam intensity is zero only at the correct angle $\theta$. This collimating system can be used in connection with the apparatus shown in Fig. 1 by simply substituting it for the divergence slit shown therein, or without that apparatus since the specimen is at the correct angular position when the meter reads zero; consequently, the previous indefiniteness of choosing a maximum meter reading is avoided.

The collimating systems shown in Figs. 6a, 6b, 6c, 7a and 8a may also be used without the apparatus shown in Fig. 1 by employing them to replace the conventional rectangular divergence slit in the known diffraction equipment, and employing operating techniques suitable for the different response curves produced by these collimating systems.

While I have described my invention in connection with specific embodiments and applications, other modifications thereof will be readily apparent to those skilled in this art without departing from the spirit and scope of the invention as defined in the appended claims.

What I claim is:

1. X-ray apparatus for orienting flat-specimen single crystals comprising a source of X-radiation, a collimator for converging and directing a primary beam of X-radiation generated by said source at said crystal, means to rotatably support said crystal in the path of said beam of radiation, means to oscillate said crystal about a given angular position relative to said primary beam of radiation through a given angular range, a detector for indicating the intensity of the diffracted beam of radiation emerging from said crystal, said detector including radiation-detecting means and current-measuring means, switching means operatively associated with said oscillating means coupling said radiation-detecting means to said current-measuring means, and means to adjust said given angular position of the crystal relative to the primary beam of radiation.

2. X-ray apparatus for orienting flat-specimen single crystals comprising a source of X-radiation, a collimator for converging and directing a primary beam of X-radiation generated by said source at said crystal, means to rotatably support said crystal in the path of said beam of radiation, means to oscillate said crystal about a given angular position relative to said primary beam of radiation through a given angular range, a detector for indicating the intensity of the diffracted beam of radiation emerging from said crystal, said detector including radiation-detecting and current-measuring means, polarity-reversing switching means coupling said radiation-detecting means to said current-measuring means, means to adjust said given angular position of the crystal relative to the primary beam of X-radiation, and means coupled to said oscillating means to actuate the switching means when the oscillating crystal passes through said given angular position.

3. X-ray apparatus for orienting flat-specimen crystals comprising a source of X-radiation, a collimator for converging and directing a primary beam of X-radiation generated by said source at said crystal, said collimator comprising an impervious member disposed in the path of the primary beam and defining a radiation pervious opening constituted by a narrow portion and a wide portion, means to rotatably support said crystal in the path of said beam of radiation, means to oscillate said crystal about a given angular position relative to said primary beam of radiation through a given angular range, a detector for indicating the intensity of the diffracted beam of radiation emerging from said crystal, and means to adjust said given angular position of the crystal relative to the primary beam of X-radiation.

4. X-ray apparatus for orienting flat-specimen single crystals comprising a source of X-radiation, a collimator for converging and directing a primary beam of X-radiation generated by said source at said crystal, said collimator comprising an impervious planar member disposed in the path of the primary beam and having an aperture therein constituted by a narrow portion and a wide portion, means to rotatably support said crystal in the path of said beam of radiation, means to oscillate said crystal about a given angular position relative to said primary beam of radiation through a given angular range, a detector for indicating the intensity of the diffracted beam of radiation emerging from said crystal, and means to adjust said angular position of the crystal relative to the primary beam of X-radiation.

5. X-ray apparatus as claimed in claim 4 in which the detector comprises radiation-detecting means and current-measuring means, and switching means coupling the radiation-detecting means to the current-measuring means.

6. A method for orienting flat-specimen single crystals which comprises impinging a primary beam of X-radiation onto one surface of said crystal, rapidly oscillating the crystal through a given angular range about a given mean angular position relative to said primary beam, measuring the average intensity of the diffracted beam of radiation emerging from said crystal for half the given range on one side of said mean position and on the other side, comparing the two measured intensities, and adjusting the mean angular position of the crystal relative to the primary beam of radiation until the compared intensities of the diffracted beams of radiation are equal.

7. A method for orienting flat-specimen single crystals which comprises impinging a primary beam of X-radiation onto one surface of said crystal, rapidly oscillating the crystal through a given angular range about a given mean angular position relative to said primary beam, measuring the average intensity of the diffracted beam of radiation emerging from said crystal for half the given range on one side of said mean position and for the other half of the given range on the other side of said mean position, and adjusting the mean angular position of the crystal relative to the primary beam of radiation until the difference between the measured average intensities of the diffracted beams of radiation is reduced to zero.

8. X-ray apparatus adapted to orient flat-specimen crystals comprising a source of X-radiation, a collimator for converging a primary beam of X-radiation generated by said source at said crystal, means to support and rotate said crystal about a given axis in the path of said beam of radiation, means to oscillate said crystal about a given angular position relative to said primary beam of radiation through a given angular range, means to adjust said angular position of the crystal relative to the primary beam of radiation, and a detector for indicating the intensity of the diffracted beam of radiation emerging from the crystal, said collimator comprising a radiation-impervious member defining a radiation-pervious opening forming a beam of X-radiation having a low-intensity wide portion and a high-intensity narrow portion perpendicular to the axis of rotation of the crystal.

9. X-ray apparatus as claimed in claim 8 in which the collimator has a beam-forming aperture having a portion of given width and a second portion of lesser width.

10. X-ray apparatus as claimed in claim 9 in which an absorption filter covers a portion of the aperture to define an aperture portion of lesser width.

11. X-ray apparatus as claimed in claim 9 in which the aperture portion of lesser width is defined by a pair of spaced low absorption filters on either side of said aperture portion.

12. X-ray apparatus as claimed in claim 8 in which the collimator comprises a discontinuous member having a sharp edge disposed half-way in the path of said beam of X-radiation.

13. X-ray apparatus as claimed in claim 8 in which the collimator comprises a thin narrow X-ray impervious member disposed in the center of the path of said beam of X-radiation.

References Cited in the file of this patent
UNITED STATES PATENTS

| | | |
|---|---|---|
| 1,535,359 | Tousey | Apr. 28, 1925 |
| 1,967,980 | Talty | July 24, 1934 |
| 2,394,622 | Luley | Feb. 12, 1946 |
| 2,490,673 | Champaygne | Dec. 6, 1949 |
| 2,602,142 | Meloy | July 1, 1952 |
| 2,641,034 | Harter | June 9, 1953 |